Nov. 3, 1959
F. C. REGGIO
2,910,969
REGULATING DEVICE
Original Filed Nov. 18, 1942
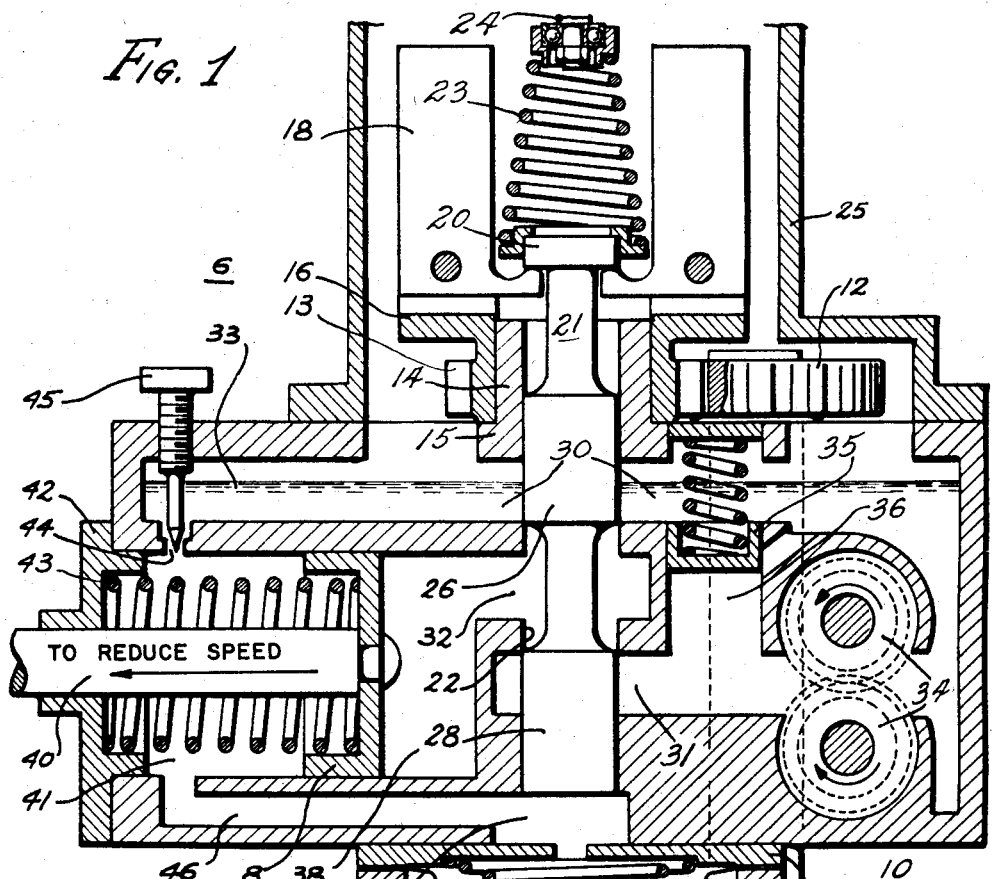
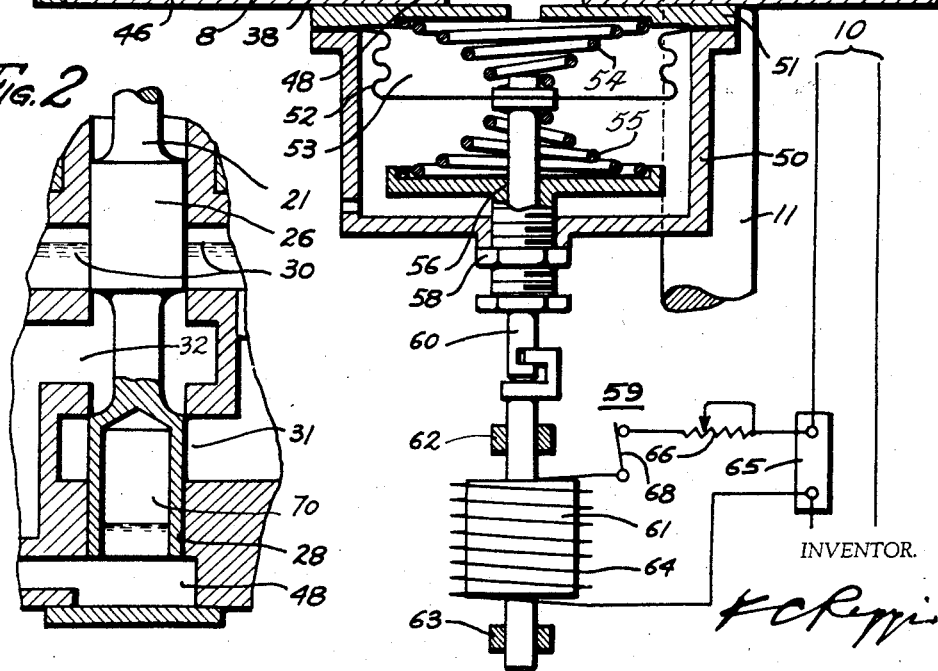
INVENTOR.

United States Patent Office 2,910,969
Patented Nov. 3, 1959

2,910,969

REGULATING DEVICE

Ferdinando Carlo Reggio, Tampa, Fla.

Application January 6, 1954, Serial No. 402,452, now Patent No. 2,812,746, dated November 12, 1957, which is a continuation of application Serial No. 466,041, November 18, 1942. Divided and this application November 6, 1957, Serial No. 694,824

15 Claims. (Cl. 121—42)

This invention relates to regulating systems such as speed governors or similar control apparatus provided with stabilizing or anticipatory means to prevent hunting, secure automatic compensation for certain variables or regulate the rate of response of the system to changes in the controlling operating conditions. The instant application is a division of my application Serial No. 402,452, filed January 6, 1954, now Patent 2,812,746, issued Nov. 12, 1957, which is a continuation of my application Serial No. 466,041, filed November 18, 1942, now abandoned.

One of the objects is to provide a speed regulating system which is comparatively simple and compact, requires a small number of moving parts and is relatively inexpensive to manufacture.

Another object is to provide a speed regulating system including a servo motor, a pilot valve therefor actuated in response to speed variations, and means for applying to the pilot valve a compensating, anticipatory or restraining fluid pressure load which varies with changes in preselected operating conditions.

A further object is to provide a simple and accurate speed regulating system including a speed governor and one or more devices operatively connected with the governor for biasing the same in response to changes in one or more operative conditions affecting the speed to be regulated.

Still another object resides in the provision of anticipatory and stabilizing means in connection with regulating devices for preventing irregular operation thereof such as hunting or throbbing.

A further object of the invention is to provide improved control systems which are capable of decreasing the time lag between the input signal and the initiation of the output response, and of controlling the speed rate of such response.

Another object is a regulating system which provides engine speed regulation to compensate for speed variations due either to load changes or to throttle position changes and does so accurately and efficiently and without hunting.

A further object is to provide an improved control system for a power plant-generator and interconnected power system for maintaining system stability throughout variations in the power demand of the connected load.

A further object is to provide a device of the type described capable of limiting the rate of change of the condition being controlled to a predetermined value, regardless of the rate of change of the input signal.

Other objects and advantages of the invention will become apparent from the following description taken in connection with the accompanying drawings, in which:

Figure 1 is a section through a speed regulating system for the control of a prime mover connected with an electric generator. Figure 2 is a fragmentary section indicating a partial modification of the governor of Figure 1.

The illustrative embodiment shown in Figure 1 includes a hydraulic governor 6 having a servo piston 8 for controlling the supply of actuating substance to a prime mover driving a generator which supplies electric current to a network 10. Neither the generator nor the prime mover is shown in the drawing. A shaft 11 driven from the prime mover carries a gear 12 which engages a companion gear 13 rotatably mounted on a cylindrical extension 14 of the governor body 15. A yoke 16 formed at the upper end of the gear 13 carries flyballs 18 engaging the collar 20 of a pilot valve 21 slidably and rotatably mounted in a bore 22 formed in the governor body 15 coaxial with the cylindrical extension 14. A speeder spring 23 applies axial downward load to the pilot valve 21 directed against the centrifugal load transmitted thereto by the flyballs 18. An axially adjustable member 24 connected by way of a ball bearing with the spring 23 serves to control the load of the latter and in turn the speed of the prime mover. A governor cover 25, only partially shown, may be provided for enclosing the flyball mechanism and guiding the slidable member 24. In operation the pilot valve 21 is driven in rotation by the flyballs 18 owing to the friction therebetween.

The pilot valve 21 has lands 26, 28 slidably fitting the bore 22 and functioning as plugs to cover and uncover the lateral ports 30 and 31 respectively. Between lands 26 and 28 the pilot valve has a portion of reduced diameter, and the open space so afforded communicates with a lateral passage 32 at all times. The pilot valve is shown in neutral position, in which both sets of ports 30 and 31 are closed. An oil reservoir 33 is provided in the governor body 15 and communicates with the flyball compartment, with ports 30 and with the suction side of a gear pump 34 which may be driven from the governor shaft 11. The discharge side of this pump is connected with the ports 31 and with a pressure oil accumulator comprising a spring-loaded valve plunger 35 slidable in a bore 36 and controlling a by-pass for leading oil back to the reservoir 33 so as to maintain the oil pressure in the accumulator 36 at substantially constant value.

The passage 32 communicates with the servo motor cylinder 38 on the right side of the piston 8. A rod 40 secured to the latter is adapted for connection with the control device of the prime mover for regulating the supply of energy thereto. Displacement of rod 40 toward the left or the right will respectively increase or decrease said supply and cause an increase or decrease of speed. The cylinder chamber 41 on the left side of piston 8 is closed by a cover 42 and contains a compression spring 43 operating on the piston 8 in opposition to the oil pressure in chamber 38. A submerged small orifice 44 whose effective area may be adjusted by means of a needle valve 45 connects the oil reservoir 33 with the cylinder chamber 41, and a duct 46 connects the latter with a chamber 48 provided at the lower end of the bore 22.

A housing 50 is attached to the governor body 15, with a plate 51 interposed therebetween, and includes a flexible diaphragm or bellows 52 defining a chamber 53 which communicates with chamber 48 by way of a passage formed in plate 51. Conical compression springs 54, 55 are mounted within the housing 50, the former between plate 51 and the bellows, and the latter between the bellows and an adjustable seat 56 having a threaded connection with the housing 50 and provided with a lock nut 58. The rate of deflection of bellows 52 may be varied by changing the axial adjustment of the seat 56. When the latter is in its lowermost position a large number of coils of the springs 54 and 55 are active, and the rate of deflection of the bellows has its maximum designed value. If the seat 56 is raised both springs are compressed, and an increasing number of the larger coils thereof come into contact with their seats and become ineffective, leaving as active coils those of smaller diameter and therefore stiffer. For the uppermost adjustment of seat 56 the springs 54 and 55 may become solidly seated, thus reducing the rate of deflection of the bellows 52 to zero.

A rod 60, attached to the movable wall of bellows 52 and slidably mounted in a bore provided in the seat 56 is connected at its lower end with a solenoid device indicated generally at 59 and including an armature 61 slidably supported by guides 62, 63 and coacting with a solenoid coil 64 connected with a shunt 65 interposed in one of the supply lines of the network 10, the voltage across the shunt, proportional to the generator load, being impressed on the solenoid. An adjustable rheostat 66 and a switch 68 are connected in series with the solenoid. While this example of solenoid arrangement is intended for a direct current system, the modifications thereof for application to an alternating current system will be obvious to those skilled in the art.

Assuming that the switch 68 is open, and therefore that the solenoid 59 is inoperative, as the prime mover runs at steady speed the flyballs 18 maintain the pilot valve 21 centered in neutral position as shown in the drawing. The oil in chambers 41, 48 and 53 has the same pressure as in the reservoir 33 with which these chambers communicate through the orifice 44. Neglecting the weight of the pilot valve 21, the centrifugal force and the resilient load applied thereto by the flyballs 18 and the spring 23 respectively are in equilibrium. If the load on the prime mover decreases, the speed increases, and the augmented centrifugal force lifts the pilot valve thus opening the ports 30, causing discharge of oil from chamber 38 to the reservoir 33 and displacement of the servo motor piston 8 toward the right under the load of the compression spring 43. This movement of the servo motor decreases the supply of actuating substance to the prime mover and causes the speed thereof to decrease.

This speed-decreasing movement of the servo motor would eventually be checked as the pilot valve resumes its neutral position and closes the ports 30, but by this time the prime mover is decelerating and its speed would continue to drop below normal, whereupon the diminished centrifugal force causes downward movement of the pilot valve, the ports 31 are opened and the servo motor piston moves to the left so as to increase the prime mover supply of actuating substance and the speed thereof. The latter however attains a value higher than the normal speed, and the irregular cyclical speed variation generally referred to as hunting is likely to continue indefinitely. To correct this condition of instability various compensating or stabilizing arrangements have been proposed. According to the invention a variable compensating fluid pressure load is applied to one end of the pilot valve, in a manner to be later described.

Upon a decrease of load on the generator, consequent acceleration of the prime mover and upward displacement of the pilot valve, the servo motor piston 8 begins to move toward the right and oil is sucked from bellows chamber 53 causing contraction of the bellows 52 from its position of resilient equilibrium. Only a small amount of oil flows into chamber 41 from the reservoir 33 through the orifice 44. As a result the oil pressure in chamber 48 temporarily drops below the value of the pressure which surrounds the upper end of the pilot valve 21, and a transient downwardly directed differential pressure load is thus applied to the latter, and restrains the upward displacement thereof. Although this transient restraining action exerted on the pilot valve is very small as compared to the centrifugal force transmitted thereto by the flyballs and by the spring 23, it causes the pilot valve to return sufficiently quickly to its neutral position, so that an underspeed condition of the prime mover does not occur. As the prime mover upon the correcting action of the servo motor gradually returns to normal speed, oil from the reservoir 33 flows through orifice 44 into chambers 41, 48 and 53, thus progressively returning the bellows 52 to its original position of equilibrium and relieving the suction force exerted on the lower end of the pilot valve. The leakage through the orifice 44 is regulated by means of the needle valve 45 in such a manner that the speed of the prime mover returns to normal at the same time that the oil pressure in chamber 48 resumes the same value as in the oil reservoir 33. Furthermore the rate of deflection of bellows 52 may be adjusted by varying the axial position of the lower spring seat 56.

When the load on the prime mover is increased its speed decreases and the action of the governor is the reverse of that just described. The pilot valve is then pressed down by the spring 23 acting against the decreased centrifugal force. This opens the ports 31 to admit pressure oil to the cylinder chamber 38 causing displacement of the servo motor piston 8 to the left and thereby increasing the prime mover supply of actuating substance. Most of the oil displaced by piston 8 from chamber 41 flows to the bellows chamber 53 resiliently expanding the latter, thereby causing increase of oil pressure in chamber 48 so as to exert a transient upward pressure load to the pilot valve to restrain its downward movement. As the pilot valve returns to neutral position upon initiating the speed correcting action of the servo motor, oil leaks through the valve 44, the bellows 52 contracts towards its original position of equilibrium, the oil pressure in chamber 48 resumes the atmospheric value, and the pressure load exerted on the pilot valve returns to zero. This transient restraining action exerted upon the pilot valve 21 and tending to return the same to neutral position is proportional to the square of the speed of motion of the servo piston 8 and therefore is effective to maintain the rate of motion of said piston, hence the rate of variation of the condition controlled thereby, within desired limits even for higher rate of change of the input signal applied to the pilot valve. The foregoing restraining action will be more fully set forth in connection with Figure 2.

The above manner of operation is obtained when the switch 68 is open, with the solenoid coil 64 not energized and the armature 61 inoperative. However, when the switch 68 is closed the solenoid is energized and a downwardly directed electromagnetic load proportional to the generator load is applied to the armature 61 and is transmitted by means of the rod 60 to the bellows 52. If the load on the generator supplying the network 10 increases suddenly, the current energizing the solenoid 64 increases accordingly causing a sudden increase of the downward pull that the armature 61 exerts on the bellows 52. The latter will tend to expand, causing suction in chamber 48 and determining a downward movement of the pilot valve so as to uncover the ports 31 and initiate a movement of the servo motor piston 8 in a direction to increase the supply of actuating substance to the prime mover even before the flyballs 18 have detected a drop of speed. The reverse action occurs upon a sudden decrease in electric load in the network 10 which determines a decrease of the downward pull transmitted by the armature 61 to the bellows 52. The latter tends to move upward, increasing the oil pressure in chamber 48 and determining an upward displacement of the pilot valve 21 so as to open ports 30 and initiate an excursion of the servo motor piston 8 in a speed-decreasing direction in anticipation of the prime mover acceleration which would otherwise follow the reduction of load.

It will be noted that the solenoid device 59 actuates the pilot valve in the same manner as and ahead of the time at which the latter would otherwise be actuated by the flyballs, so as to compensate for the delay in the response of the governor and reduce the magnitude of the speed surges occurring under sudden variations of load. Owing to the leakage valve 44 the action of the solenoid device 59 on the pilot valve 21 is of temporary nature.

The amount of compensation effected by the solenoid may be adjusted by means of the rheostat 66, and by means of the seat 56 which serves to regulate the rate of deflection of the bellows 52.

It will be appreciated that the oil displacement in chamber 41 due to movement of the servo motor piston 8 is many times larger than the oil displacement in chamber 48 caused by sliding motion of the pilot valve 21. For the purpose of rendering a numerical example more simple it may be assumed that the seat 56 is adjusted in its uppermost position so as to block the diaphragm 52. In which case as the pilot valve 21 or the piston 8 are moving at a given velocity, the corresponding velocity of the oil forced through the orifice 44 is proportional to the square of the effective diameter of said valve or piston, and the change of pressure in chamber 48 is proportional to the fourth power of said diameter. Assuming for instance that the face of the piston 8 defining chamber 41 has an effective diameter four times as large as that of the pilot valve, when the piston 8 is moving at a certain velocity it determines a transient relative pressure in chamber 48 which is 256 times as large as that occurring when the pilot valve 21 is moving at the same velocity. It will therefore be readily understood that where the diameter and stroke of piston 8 are so designed in relation to the pilot valve 21, the orifice 44, suitably adjusted by means of the needle valve 45 for correct operation of the governor, will not oppose any appreciable resistance to the free motion of the pilot valve. The danger that chamber 48 may operate as an objectional dashpot for the pilot valve and prevent rapid displacement of the latter in response to rapid speed changes, thus resulting in serious overspeed or underspeed upon sudden load variation may therefore be entirely avoided.

Where no anticipatory actuation of the pilot valve by means of the electromagnetic device 59 is desired, the solenoid 59 and the rod 60 may be omitted. Furthermore in substitution for the resiliently loaded bellows 52 other equivalent cushioning means may be provided, such as a resiliently loaded slidable piston, or an air accumulator communicating with chamber 48.

Figure 2 shows a partial modification of Figure 1 indicating an air chamber or accumulator 70 provided in the lower portion of the pilot valve in substitution for the bellows chamber 53, the governor being otherwise similar to that of Figure 1. It will be appreciated that this form of governor is extremely simple, compact and contains a very small number of moving parts as compared to other isochronous governors. It will be noted that in the arrangement shown in Figure 2 the air chamber 70, formed within the lower end of the pilot valve, is very small and the cushioning effect thereof is quite limited. If we assume that this form of governor is used to control a variable-speed powerplant, that the latter is operating at low governed speed, and that the operator suddenly moves the control lever to full-speed setting, then the load of the governor spring 23 will be instantly increased to its maximum designed load corresponding to maximum speed of the powerplant, and as a result the pilot valve 28 will be shifted all the way downward, fully opening the port admitting hydraulic fluid from the high pressure system 31, 36 to the cylinder chamber 38. This motion of the pilot valve will not cause any objectionable pressure rise in the hydraulic fluid at the lower end thereof, as the small volume of fluid displaced by the pilot valve is in part discharged at low velocity through the orifice 44, while the remainder causes a slight compression of the air in the cushion chamber 70. However, the ensuing motion of the piston 8 toward the left displaces fluid at a much higher rate, causing a substantial increase in pressure. The air in the cushion chamber 70 soon contracts to a very small volume, whereupon substantially all of the fluid displaced by the power piston 8 must be discharged through the small orifice 44. The resulting increase in fluid pressure exerts on the lower end of the pilot valve 21 a restraining action tending to return the same to its neutral position, which action is proportional to the square of the speed of motion of the servo piston 8, and is therefore effective to limit the rate of motion thereof. It will be appreciated that by suitably adjusting the effective area of the orifice 44 the maximum rate of motion of the servomotor, and in turn the maximum rate of change in the condition being controlled, may be limited to any desired or predetermined value, said rate varying in relation to the magnitude and suddenness of the input signal or load exerted upon the pilot valve.

In the above disclosed arrangement the governor is adapted to increase or decrease the supply of energy to a prime mover in response to deceleration or acceleration of the latter due to increase or decrease of the load applied thereto, respectively.

While the hydraulic medium used in the governor disclosed has been referred to as lubricating oil, any other appropriate fluid may be used in substitution therefor. In the above disclosed speed regulating system a decrease of pressure of the fluid actuating the servo motor thereof causes a reduction of speed of the prime mover. For example, in Figure 1 a pressure drop in the cylinder chamber 38 causes a movement of the piston 40 to the right which, as indicated by the arrow, determines a reduction of prime mover speed. This may be considered a safety feature, for an accidental interruption in the supply of the actuating pressure fluid to the servo motor, as may be due to failure of the fluid pump or rupture of a fluid conduit causes the prime mover to stop.

While the above disclosed embodiments show the application of stabilizing or compensating means to speed regulating systems or governors, according to the invention said stabilizing or compensating means may also be used in connection with any suitable system for regulating one or more conditions other than speed. It is therefore to be expressly understood that the invention is not limited to the specific embodiments shown, but may be used in various other ways, and various modifications may be made to suit different requirements, and that other changes, substitutions, additions and omissions may be made in the construction, arrangement and manner of operation and adjustment within the limits or scope of the invention as defined in the following claims. And where claims are directed to less than all the elements of the complete system disclosed, they are intended to cover possible uses of the recited elements in installations which may not include the non-recited elements.

I claim:

1. A hydraulic governor comprising a hydraulic pressure operated regulator member, a pilot valve movable in opposite directions to move said regulator member in opposite directions, a fluid pressure chamber and a piston movable directly with said pilot valve for compressing and expanding said chamber upon movement of the pilot valve in opposite directions, a compensating chamber including a wall member movable to compress and expand said compensating chamber, said two chambers being in continuous fluid communication, an adjustable leakage orifice leading from the fluid system including said two chambers to a source of fluid under substantially no pressure, resilient means acting on said compensating wall member for yieldably tending to retain the same in a neutral position, and means movable by and with the regulator member and acting upon said resilient means to vary the neutral position of said compensating wall member in response to movements of said regulator member.

2. A hydraulic governor comprising a hydraulic pressure operated regulator member, a pilot valve movable in opposite directions to move said regulator member in opposite directions, a fluid pressure chamber and a piston movable directly with said pilot valve for compressing and expanding said chamber upon movement of the pilot valve in opposite directions, a compensating chamber including a wall member movable to compress and expand said compensating chamber, said two chambers being in continuous fluid communication, an adjustable leakage orifice leading from the fluid system including said two chambers to a source of fluid under substantially no pressure, resilient means acting on said compensating wall member for yieldably tending to retain the same in a neutral position, means movable by the regulator member in direct proportion to movements thereof and acting upon said resilient means to vary the neutral position of said compensating wall member in response to movement of said regulator member, and means for adjustably varying the ratio of said proportionally movable means.

3. A hydraulic governor comprising a hydraulic pressure operated regulator member, a pilot valve movable in opposite directions to move said regulator member in opposite directions, a fluid pressure chamber and a piston movable directly with said pilot valve for compressing and expanding said chamber upon movement of the pilot valve in opposite directions, a compensating chamber including a wall member movable to compress and expand said compensating chamber, said two chambers being in continuous fluid communication, an adjustable leakage orifice leading from the fluid system including said two chambers to a source of fluid under substantially no pressure, resilient means acting on said compensating wall member for yieldably tending to retain the same against movement in either direction from a neutral position, and means movable by the regulator member and acting upon said resilient means to vary the resilient bias thereof in response to movement of said regulator member and thus vary said neutral position.

4. A hydraulic governor comprising a hydraulic pressure operated regulator member, a pilot valve movable in opposite directions to move said regulator member in opposite directions, a fluid pressure chamber and a piston movable directly with said pilot valve for compressing and expanding said chamber upon movement of the pilot valve in opposite directions, a compensating chamber including a wall member movable to compress and expand said compensating chamber, said two chambers being in continuous fluid communication, an adjustable leakage orifice leading from the fluid system including said two chambers to a source of fluid under substantially no pressure, resilient means acting on said compensating wall member for yieldably tending to retain the same against movement in either direction from a neutral position, means movable by the regulator member and acting upon said resilient means to vary the resilient bias thereof in response to movement of said regulator member and thus vary said neutral position, and means for adjustably varying the ratio of movement of said movable means in response to movement of said regulator member.

5. A hydraulic governor comprising a hydraulic pressure operated regulator member, a pilot valve movable in opposite directions to move said regulator member in opposite directions, a fluid pressure chamber and a piston movable directly with said pilot valve for compressing and expanding said chamber upon movement of the pilot valve in opposite directions, a compensating chamber including a wall member movable to compress and expand said compensating chamber, said two chambers being in continuous fluid communication, an adjustable leakage orifice leading from the fluid system including said two chambers to a source of fluid under substantially no pressure, resilient means acting on said compensating wall member for yieldably tending to retain the same in a neutral position, and means movable by and with the regulator member and acting upon said resilient means to vary the neutral position of said compensating wall member in response to movement of said regulator member, said movable means acting to yieldably compress said compensating chamber upon compressing movement of said pilot valve piston and yieldably expand the same upon expanding movement of said pilot valve piston.

6. A hydraulic governor comprising a hydraulic pressure operated regulator member, a pilot valve movable in opposite directions to move said regulator member in opposite directions, a fluid pressure chamber and a piston movable directly with said pilot valve for compressing and expanding said chamber upon movement of the pilot valve in opposite directions, a compensating chamber and a wall member therein movable to compress and expand said compensating chamber, said two chambers being in continuous fluid communication, an adjustable leakage orifice leading from the fluid system including said two chambers to a source of fluid under substantially no pressure, normally balanced opposed springs acting against opposite sides of said compensating wall member for yieldably retaining the same in a neutral position, and means movable by and with the regulator member and acting against one of said springs to vary the neutral position of said compensating wall member in response to movement of said regulator member, said movable means acting to yieldably compress said compensating chamber upon compressing movement of said pilot valve piston and yieldably expand the same upon expanding movement of said pilot valve piston.

7. A hydraulic governor comprising a hydraulic pressure operated regulator member, a pilot valve movable in opposite directions to move said regulator member in opposite directions, a fluid pressure chamber and a piston movable directly with said pilot valve for compressing and expanding said chamber upon movement of the pilot valve in opposite directions, a compensating chamber including a wall member movable to compress and expand said compensating chamber, said two chambers being in continuous fluid communication, an adjustable leakage orifice leading from the fluid system including said two chambers to a source of fluid under substantially no pressure, normally balanced opposed springs acting against opposite sides of said compensating wall member for yieldably retaining the same in a neutral position, and means movable by and with the regulator member and acting against one of said springs to vary the neutral position of said compensating wall member in response to movement of said regulator member.

8. A hydraulic governor comprising a hydraulic pressure operated regulator member, a pilot valve movable in opposite directions to move said regulator member in opposite directions, a fluid pressure chamber and a piston movable directly with said pilot valve for compressing and expanding said chamber upon movement of the pilot valve in opposite directions, a compensating chamber including a wall member movable to compress and expand said compensating chamber, said two chambers being in continuous fluid communication, an adjustable leakage orifice leading from the fluid system including said two chambers to a source of fluid under substantially no pressure, normally balanced opposed springs acting against opposite sides of said compensating wall member for yieldably retaining the same in a neutral position, means movable by and with the regulator member and acting against one of said springs to vary the neutral position of said compensation wall member in response to movement of said regulator member, and means for adjustably varying the ratio of movement of said movable member in response to movement of said regulator member.

9. A hydraulic governor comprising a hydrulic pressure operated regulator member, a pilot valve movable in opposite directions to move said regulator member in opposite directions, a fluid pressure chamber and a piston movable directly with said pilot valve for compressing and expanding said chamber upon movement of the pilot valve in opposite directions, a compensating chamber including a wall member movable to compress and expand said compensating chamber, said two chambers being in continuous fluid communication, resilient means acting on said compensating wall member for yieldably tending to retain the same in a neutral position, and means movable by and with the regulator member and acting upon said resilient means to vary the resilient bias thereof in response to movement of said regulator member.

10. A hydraulic governor comprising a hydraulic pressure operated regulator member, a pilot valve movable in opposite directions to move said regulator member in opposite directions, a fluid pressure chamber and a piston movable directly with said pilot valve for compressing and expanding said chamber upon movement of the pilot valve in opposite directions, an accumulator chamber including a movable wall member and resilient means normally retaining said wall member in a neutral position, said accumulator chamber being in free fluid communication with said fluid pressure chamber, an adjustable leakage orifice leading from the fluid system comprising said fluid pressure chamber and said accumulator chamber, and means movable by the regulator member and acting on said resilient means to vary the neutral position of said movable wall member in response to movement of said regulator member.

11. A hydraulic governor comprising a hydraulic pressure operated regulator member, a pilot valve movable in opposite directions to move said regulator member in opposite directions, a fluid pressure chamber and a piston movable directly with said pilot valve for compressing and expanding said chamber upon movement of the pilot valve in opposite directions, an accumulator chamber including a movable wall member and resilient means normally retaining said wall member in a neutral position, said accumulator chamber being in free fluid communication with said fluid pressure chamber, and means movable by the regulator member and acting on said resilient means to vary the neutral position of said movable wall member in response to movement of said regulator member.

12. A hydraulic governor comprising a hydraulic pressure operated regulator member, a pilot valve movable in opposite directions to move said regulator member in opposite directions, a fluid pressure chamber and a piston movable directly with said pilot valve for compressing and expanding said chamber upon movement of the pilot valve in opposite directions, a compensating chamber including a wall member movable to compress and expand said compensating chamber, said two chambers being in continuous fluid communication, resilient means acting on said compensating wall member for yieldably tending to retain the same in a neutral position, means movable by and with regulator member and acting upon said resilient means to vary the resilient bias thereof in response to movement of said regulator member, and means for adjustably varying the proportion of relative movements as between said movable means and said regulator member.

13. A hydraulic governor comprising a hydraulic pressure operated regulator member, a pilot valve movable in opposite directions to move said regulator member in opposite directions, a fluid pressure chamber and a piston movable directly with said pilot valve for compressing and expanding said chamber upon movement of the pilot valve in opposite directions, an accumulator chamber including a movable wall member and resilient means normally retaining said wall member in a neutral position, said accumulator chamber being in free fluid communication with said fluid pressure chamber, means movable by the regulator member and acting on said resilient means to vary the neutral position of said movable wall member in response to movement of said regulator member, and means for adjustably varying the proportion of relative movements as between said movable means and said regulator member.

14. A hydraulic governor comprising a hydraulic pressure operated regulator member, a pilot valve movable in opposite directions to move said regulator member in opposite directions, a fluid pressure chamber and a piston movable directly with said pilot valve for compressing and expanding said chamber upon movement of the pilot valve in opposite directions, an accumulator chamber including a movable wall member and resilient means normally retaining said wall member in a neutral position, said accumulator chamber being in free fluid communication with said fluid pressure chamber, an adjustable leakage orifice leading from the fluid system comprising said fluid pressure chamber and said accumulator chamber, and means movable by the regulator member and acting on said resilient means to vary the neutral position of said movable wall member in response to movement of said regulator member, said movable means acting to yieldably compress said accumulator chamber upon compressing movement of said pilot valve piston and yieldably expand the same upon expanding movement of said pilot valve piston.

15. A hydraulic governor comprising a hydraulic pressure operated regulator member, a pilot valve movable in opposite directions to move said regulator member in opposite directions, a fluid pressure chamber and a piston movable directly with said pilot valve for compressing and expanding said chamber upon movement of the pilot valve in opposite directions, an accumulator chamber including a movable wall member and resilient means normally retaining said wall member in a neutral position, said accumulator chamber being in free fluid communication with said fluid pressure chamber, and means movable by the regulator member and acting on said resilient means to vary the neutral position of said movable wall member in response to movement of said regulator member, said movable means acting to yieldably compress said accumulator chamber upon compressing movement of said pilot valve piston and yieldably expand the same upon expanding movement of said pilot valve piston.

References Cited in the file of this patent

UNITED STATES PATENTS

| | | |
|---|---|---|
| 2,233,307 | Dodson | Feb. 25, 1941 |
| 2,245,562 | Becker | June 17, 1941 |
| 2,252,693 | Becker | Aug. 19, 1941 |
| 2,347,104 | Hoover | Apr. 18, 1944 |
| 2,396,321 | Goddard | Mar. 12, 1946 |
| 2,407,317 | Mennesson | Sept. 10, 1946 |
| 2,410,774 | Chandler | Nov. 5, 1946 |
| 2,769,431 | Massey | Nov. 6, 1956 |
| 2,812,746 | Reggio | Nov. 12, 1957 |